(12) United States Patent
Zhang et al.

(10) Patent No.: US 11,436,395 B2
(45) Date of Patent: Sep. 6, 2022

(54) METHOD FOR PREDICTION OF KEY PERFORMANCE PARAMETER OF AN AERO-ENGINE TRANSITION STATE ACCELERATION PROCESS BASED ON SPACE RECONSTRUCTION

(71) Applicant: Dalian University of Technology, Dalian (CN)

(72) Inventors: Shuo Zhang, Dalian (CN); Xiaoyu Sun, Dalian (CN); Jibang Li, Dalian (CN); Ximing Sun, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 437 days.

(21) Appl. No.: 16/629,752

(22) PCT Filed: Jun. 27, 2018

(86) PCT No.: PCT/CN2018/093077
§ 371 (c)(1),
(2) Date: Jan. 9, 2020

(87) PCT Pub. No.: WO2020/000248
PCT Pub. Date: Jan. 2, 2020

(65) Prior Publication Data
US 2020/0184131 A1    Jun. 11, 2020

(51) Int. Cl.
*G01M 15/00* (2006.01)
*G06F 30/27* (2020.01)
(Continued)

(52) U.S. Cl.
CPC ............ *G06F 30/27* (2020.01); *G01M 15/00* (2013.01); *G06K 9/6262* (2013.01); *G06N 5/003* (2013.01);
(Continued)

(58) Field of Classification Search
CPC .. G06F 30/27; G06F 2119/08; G06F 2111/08; G06F 30/15; G06K 9/6262;
(Continued)

(56) References Cited

U.S. PATENT DOCUMENTS

| 11,333,575 B2* | 5/2022 | Zhang | G06N 20/20 |
| 2020/0148395 A1* | 5/2020 | Zhang | G06N 20/10 |

FOREIGN PATENT DOCUMENTS

| CN | 107886126 A | 4/2018 |
| WO | WO2017221923 A1 | 12/2017 |

OTHER PUBLICATIONS

A Chinese Office Action with English translation cited in application No. 201810675418.0, dated Sep. 4, 2019, 8 pages.

* cited by examiner

*Primary Examiner* — Nghia M Doan
(74) *Attorney, Agent, or Firm* — Muncy, Geissler, Olds & Lowe, P.C.

(57) ABSTRACT

A method for prediction of key performance parameters of an aero-engine transition state acceleration process based on space reconstruction. Aero-engine transition state acceleration process test data provided by a research institute is used for establishing a training dataset and a testing dataset; dimension increase is conducted on the datasets based on the data space reconstruction of an auto-encoder; model parameters optimization is conducted by population optimization algorithms which is represented by particle swarm algorithm; and random forest regression algorithm performing well on high-dimensional data is used for carrying out regression on transition state performance parameters, which realizes effective real-time prediction from the perspective of engineering application.

1 Claim, 7 Drawing Sheets

(51) Int. Cl.
*G06N 20/10* (2019.01)
*G06K 9/62* (2022.01)
*G06N 5/00* (2006.01)
*G06F 119/08* (2020.01)
*G06F 30/15* (2020.01)

(52) U.S. Cl.
CPC ............. *G06N 20/10* (2019.01); *G06F 30/15* (2020.01); *G06F 2119/08* (2020.01)

(58) Field of Classification Search
CPC ............. G06K 9/00536; G06K 9/6256; G06K 9/6282; G06N 5/003; G06N 20/10; G06N 3/006; G06N 3/082; G06N 20/20; G01M 15/00
See application file for complete search history.

METHOD FOR PREDICTION OF KEY PERFORMANCE PARAMETER OF AN AERO-ENGINE TRANSITION STATE ACCELERATION PROCESS BASED ON SPACE RECONSTRUCTION

TECHNICAL FIELD

The present invention belongs to the technical field of aero-engine performance parameter prediction and particularly relates to a method for prediction of key performance parameter of an aero-engine transition state acceleration process based on space reconstruction.

BACKGROUND

The possibility of failure of an aero-engine operating in a complex environment with high temperature, high pressure and high speed for a long time increases over time. The performance of the transition state acceleration process directly relates to the progress of the takeoff and accelerated flight process of an aircraft. Since the mechanism of an aero-engine is extremely complex, it is difficult to model the transition state process parameters. Therefore, the data driven-based aero-engine performance parameter advanced prediction method can avoid building the model of the engine mechanism with complex process, and provide early forecast for the parameter state of the engine transition state acceleration process to ensure the safety of life and property.

Many domestic and foreign scholars have done relevant work on data driven-based aero-engine transient state performance parameter prediction. However, the traditional prediction algorithm has high requirements for model parameters and input features, and usually has to adjust the parameters by the optimization algorithm before modeling; all parameter features of different types of engines have different degrees of influence on model prediction accuracy, and features are needed to be re-selected; the change rule of the transition state acceleration process parameters is complex, and the degree of influence of the model parameters on the prediction accuracy is large; the traditional regression prediction algorithm performs poorly on the high-dimensional data sample, and the spatial dimension of the transient state acceleration process data sample is far from enough to describe the aero-engine performance; and the generalization ability of the model is poor, so when the engine is changed, there is a need to re-select the model parameters and input features, which increases the human and financial consumption to a certain extent.

Therefore, aiming at difficulties in model parameters selection, the present invention proposes a parameter prediction method based on a Random Forest (RF) algorithm. Compared with the traditional machine learning regression algorithm, the RF algorithm has the advantages of insensitivity to multivariate collinearity, high prediction accuracy, high convergence rate, less and easy-to-understand adjustable parameters, good performance on high-dimensional data, no over fitting, etc. With the characteristics of high efficiency and accuracy, Random Forest is increasingly used in all walks of life. Aiming at difficulties in feature selection, the present invention proposes a neural network-based sparse auto-encoder (SAE) for conducting dimension increase and reduction on input features. Compared with the traditional feature selection algorithms (such as PCA), the dimension increase and reduction of the features by SAE can be adjusted according to the algorithm, which has the effect of improving the prediction accuracy for algorithms such as RF algorithm which show accurate prediction effect even on independent variables with high dimension. For the two algorithms, the parameter optimization algorithm is adopted to optimize the model parameters, and from the perspective of practical engineering application, the key performance parameters of the engine, such as compressor physical speed and exhaust gas temperature, are predicted.

SUMMARY

Aiming at the above-mentioned defects existing in the prior art, the present invention provides a method for prediction of performance parameters of an aero-engine transition state acceleration process based on space reconstruction.

Figure 1:
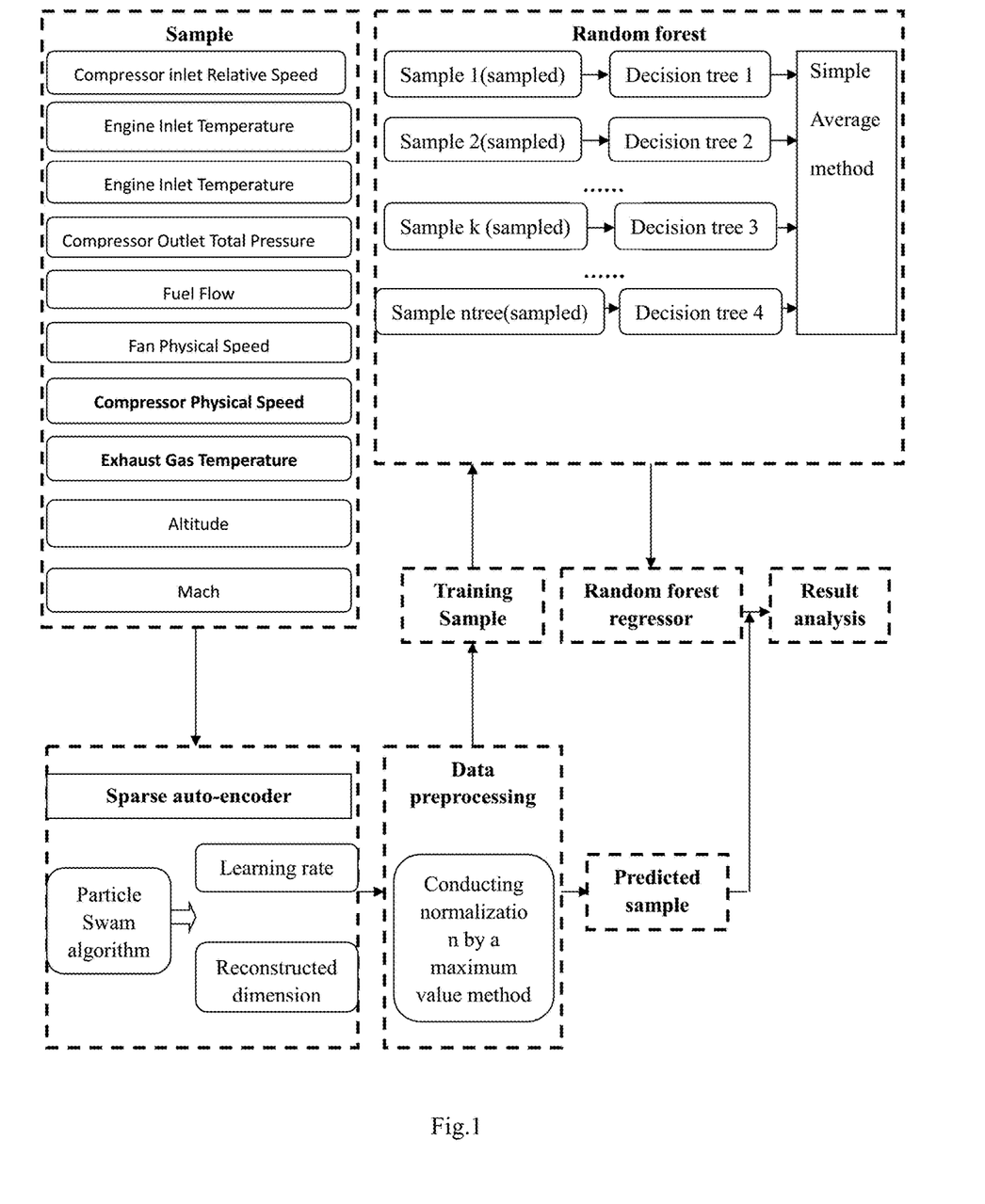
FIG. 1 is a flow chart of establishing an aero-engine transition state acceleration process key performance parameter prediction model.
Figure 2:
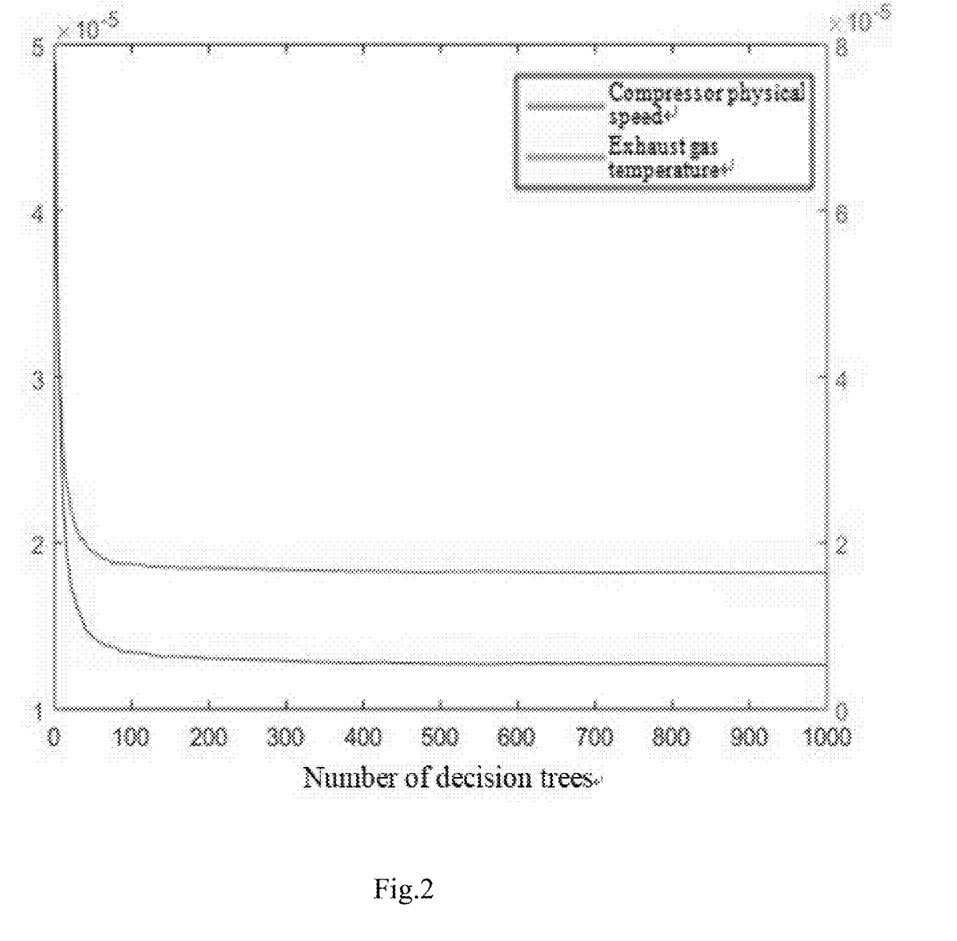
FIG. 2 is a curve graph showing a relationship between the out-of-bag error rate and the number of Decision Trees of the model.

The technical solution of the present invention is:

A method for prediction of key performance parameters of an aero-engine transition state acceleration process based on space reconstruction, comprising the following steps:

Step 1: preprocessing aero-engine test data;

(1) Aero-engine transition state acceleration process test data comprises 10 kinds of parameters: compressor inlet relative speed $PNNC2_g$, engine inlet temperature $T_2$, engine inlet pressure $P_2$, compressor outlet total pressure $P_3$, fuel flow WFB, fan physical speed $N_f$, compressor physical speed $N_c$, exhaust gas temperature $T_5$, simulated altitude H and simulated Mach Ma, which are considered as one sample;

(2) Data storage and reading: the aero-engine transition state acceleration process test data comprises data collected at multiple aero-engine commissioning process sites. Combining the data collected at multiple aero-engine commissioning process sites for the aero-engine acceleration process, and storing the data uniformly, then establishing an aero-engine performance parameter test database;

(3) Linear resampling: analyzing aero-engine acceleration process test data. Because sampling time intervals are different, a linear resampling method is adopted to resample the aero-engine acceleration process test data to make the sampling frequencies of signal identical;

(4) Data screening and cleaning: conducting visualization processing on the linearly resampled aero-engine transition state acceleration process test data, and conducting cleaning on acceleration curves which obviously do not meet objective conditions;

Step 2: conducting Random Forest regression model parameters selection;

The Random Forest regression model has two key parameters: ntree which is the number of Regression Trees in the Random Forest regression model, if ntree is too small, the accuracy of the model prediction is low, and if ntree is too large, the calculation time that is too long is disadvantageous to real-time prediction; and mtry which is the feature number of Regression Trees in the Random Forest regression model, i.e. the number of branches of each Regression Tree; because the parameter of the Random Forest regression model is a dispersed integer value, two-dimensional grid search is selected for ergodic calculation of the parameters ntree and mtry, and MSE is selected for a fitness function (i.e. the returned value of parameter optimization); and the optimization range of the two-dimensional grid search is determined by the following principles:

(1) the optimization range of ntree is determined by the out-of-bag error rate (OOB error rate), wherein the OOB error rate is the error rate caused by the regression of the data which is not selected as the training sample for a single Decision Tree at a time; variation curves of OOB calculated for compressor physical speed $N_c$ and engine exhaust gas temperature EGT as the predicted test data feature parameters as well as the parameter ntree are shown in FIG. 2; and therefore the optimization range of ntree is determined to be 50~500;

(2) the optimization range of mtry is determined to be from the natural number 1 to the total feature number of the test data;

The Random Forest regression model parameters selection of the present invention is determined to be ntree=300 and mtry=D/3 by the grid optimization algorithm, wherein D is the number of input variables of the model;

Step 3: establishing a training database by using a sparse auto-encoder;

After determining the parameters of the Random Forest regression model, determining the related parameters of SAE by using an SAE-RF hybrid model. Because it is difficult for 10 parameter features of the aero-engine test data to meet the accuracy requirement of the aero-engine transition state parameter prediction model, the sparse representation of the aero-engine test data is selected to be learned out to mine more information from 10-dimensional input variable. Establishing the input vector of the model by using SAE with the structure of 10-dim-10. In the present invention, the parameters of SAE are optimized by the dispersed-continuous hybrid particle swarm algorithm (PSO), wherein the important parameters of SAE comprise learning rate $\alpha$ and reconstructed dimension dim.

In the present invention, the principle of using the particle swarm algorithm for optimization is as follows: in two-dimensional parameter searching space, there is a population $X=(X_1, X_2, \ldots, X_n)$ composed of n parameter combinations, wherein the position of the $k^{th}$ parameter combination in the parameter searching space is expressed as a two-dimensional vector $X_k=(x_{k1}, x_{k2})$. Assuming the $k^{th}$ parameter combination has the velocity $V_k=(V_{k1}, V_{k2})^T$ in the searching space, the local best parameter thereof is $P_k=(P_{k1}, P_{k2})^T$ and the global best parameter of the parameter combination is $P_g=(P_{g1}, P_{g2})^T$. In each iteration, the iterative formulas of the velocity and the position of the parameter combination are expressed as:

$$V_k^{t+1}=wV_k^t+c_1r_1(P_k^t-X_k^t)+c_2r_2(P_g^t-X_k^t)$$

$$X_k^{t+1}=X_k^t+V_k^{t+1}$$

where, w is inertia weight, t is the current number of iterations, $r_1$, $r_2$ are random numbers with uniform distribution in [0,1], and $c_1$, $c_2$ are learning factor constants.

The K-fold cross-validation method is generally used for the estimation of generalization ability in parameters selection, and the specific steps of optimizing the SAE-RF hybrid model parameters based on the dispersed-continuous hybrid particle swarm algorithm are as follows:

(1) randomly producing a group of $\{\alpha, dim\}$ as the initial position of particles, and determining inertia weight and learning factor;

(2) evenly splitting the training sample into k mutually exclusive subsets $S_1, S_2, \ldots, S_k$;

(3) taking the value of the initial position of the population as a parameter to train the SAE-RF hybrid model, and calculating the average value of k accuracies, which is the accuracy of the K-fold cross-validation;

(4) taking the accuracy of the K-fold cross-validation as the fitness of the particle swarm algorithm, calculating the local best position and the global best position of the population, and iterating and updating the position and velocity;

(5) repeating the step (2) until the fitness requirements are met or the maximum number of iterations is reached;

(6) completing the parameter optimization, and taking the result as the parameter of the final SAE-RF hybrid model;

Step 4: building an SAE-RF regression model, predicting the aero-engine test data, and evaluating the prediction effect.

Since the magnitude difference between the features after sparse representation of the aero-engine test data is large, the data sample is normalized by a maximum value method to avoid the model error caused by the magnitude difference. In the present invention, the features of the aero-engine transition state acceleration process test data after sparse representation are normalized into the interval [1,2] according to the following formula:

$$x_k = \frac{x_k - x_{min}}{x_{max} - x_{min}} + 1$$

Conducting regression prediction on the compressor physical speed $N_c$ and engine exhaust gas temperature EGT by using the aero-engine transition state acceleration process test data after dimension reconstruction, and calculating the response evaluating indicator;

The main evaluating indicators comprise:

(1) relative error (RE)

The formula of the relative error is:

$$RE = \frac{|\hat{y}_i - y_i|}{y_i}, i = 1, 2 \ldots N$$

where, $\hat{y}_i$ is the predicted value of the sample at the $i^{th}$ moment, $y_i$ is the observed value of the sample at the $i^{th}$ moment, and N is the length of the sample;

(2) mean square error (MSE)

The mean square error is a measure reflecting the difference between the predicted sequence and the observed sequence, and is calculated according to the following formula:

$$MSE = \frac{1}{N}\sum_{i=1}^{N}(y_i - \hat{y}_i)^2$$

where, $\hat{y}_i$ is the predicted value of the sample at the $i^{th}$ moment, $y_i$ is the observed value of the sample at the $i^{th}$ moment, and N is the length of the sample.

The present invention has the following beneficial effects that: in the present invention, aero-engine transition state acceleration process test data provided by a research institute is used for establishing a training dataset and a testing dataset; dimension increase is conducted on the datasets based on the data space reconstruction of an auto-encoder; population optimization algorithms represented by a particle swarm algorithm (PSO) are adopted to optimize model parameters; and finally, a Random Forest regression algorithm performing well on high-dimensional data is used for regressing transition state performance parameters, which realizes effective real-time prediction from the perspective of engineering application.

DETAILED DESCRIPTION

Specific embodiment of the present invention is further described below in combination with accompanying drawings and the technical solution.

The data used in the present invention is 100 groups of transition state acceleration process bench test data of a certain type of aero-engine, which are provided by a domestic research institute.

Step 1: preprocessing aero-engine test data;

(1) Aero-engine test data comprises 10 groups of parameters: compressor inlet relative speed $PNNC2_g$, engine inlet temperature $T_2$, engine inlet pressure $P_2$, compressor outlet total pressure $P_3$, fuel flow WFB, fan physical speed $N_f$, compressor physical speed $N_c$, exhaust gas temperature $T_s$, simulated altitude H and simulated Mach Ma;

(2) Data integration: reading, integrating and storing txt files of 100 groups of data, and establishing an aero-engine test database.

(3) Resampling: resampling the data first due to different sampling intervals. The specific steps are as follows: inserting the proposed new sampling frequency as an interpolation into the time series of the original data by using an interpolation method, and counting the number of original data between nominal sampling points. If only one original data is included, taking the original data as the data corresponding to the sampling point; if two original data are included, calculating the average value of the two original data, and taking the average value as the data corresponding to the time point; and if no original data is included, taking the average value of the data corresponding to the previous time point and the next time point of the time point in the nominal time series as the data of the time point.

(4) Data screening and cleaning: conducting visualization processing on the data in order to conduct simple clustering and cleaning on acceleration curves.

Step 2: conducting Random Forest regression model parameters selection;

In the present invention, the parameter optimization range based on grid research is determined according to FIG. 2, finally the optimization range of 50 to 500 and the optimization step length of 10 for ntree are selected; selecting the optimization range of 1 to D and the optimization step length of 1 for mtry, wherein D is the dimension of the input vector of the model, i.e. the dimension of the test data samples. Calculating the value of the fitness function by the 3-fold cross-validation method, splitting 90 groups of test data samples into three parts, and conducting three prediction tasks on each part.

$$m_k = saerftrain(x^{tr_k}, y^{tr_k}, ntree, mtry) k=1,2,3$$

Taking the average value of mean square errors of the three tasks as the value of the fitness function corresponding to this group of parameters:

$$mse_k = \frac{1}{N}\sum_{i=1}^{N}(saerfregression(x^{te_k}, m_k, ntree, mtry) - y^{te_k})^2$$

$$k = 1, 2, 3$$

$$MSE = (mse_1 + mse_2 + mse_3)/3$$

Figure 3:
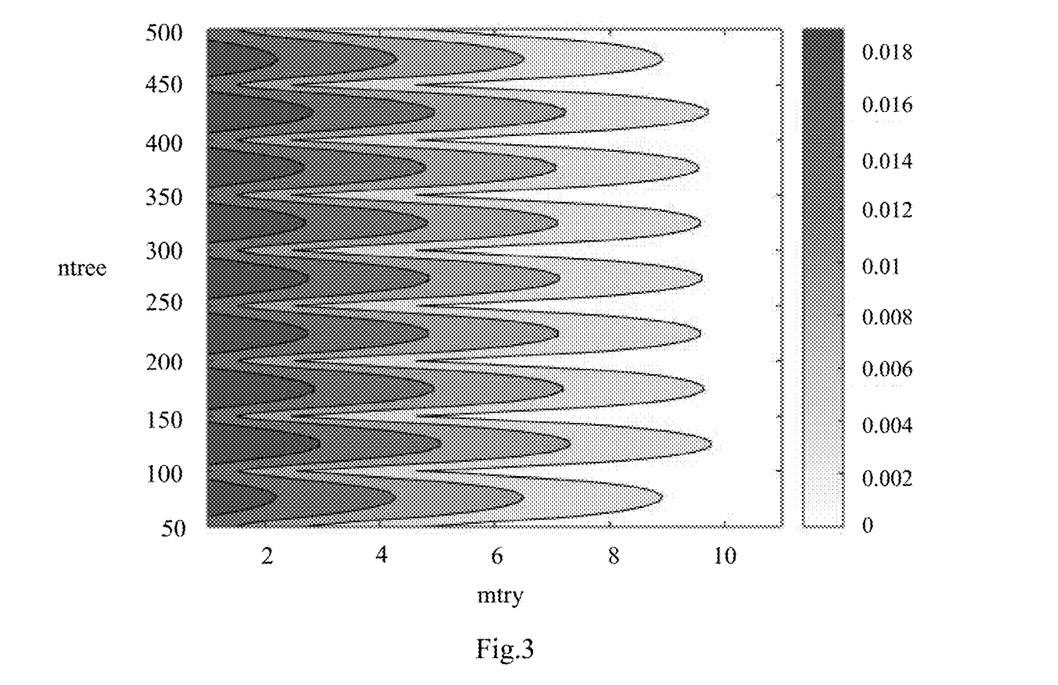
FIG. 3 is a diagram of a best parameter result of a Random Forest regression model for grid search.

The final optimization result is shown in FIG. 3. Considering the influence factors such as time cost and calculated amount, the final parameter selection results are ntree=300, mtry=D/3, wherein D is the dimension of the input vector of the model.

Step 3: establishing a training database by using a sparse auto-encoder;

The important parameters of the sparse auto-encoder in the present invention comprise learning rate α and reconstructed dimension dim, wherein α is a continuous value and dim is a dispersed integer value, so a dispersed-continuous hybrid particle swarm algorithm is used for optimization in two dimensions of parameters, and the 3-fold cross-validation method is also used. Setting the number of groups in the initial population to 10 and the maximum number of iterations to 50, and randomly setting the initial position of particles to {[0,1],{1,2 ... 50}}. Attention is needed to limit dim to not lower than 1 or larger than 50 during random setting of the initial velocity of particles. Setting the inertia weight to $$\frac{1}{2\ln 2}$$

and the learning factor to $c_1=c_2=0.5+\ln 2$.

Figure 4:
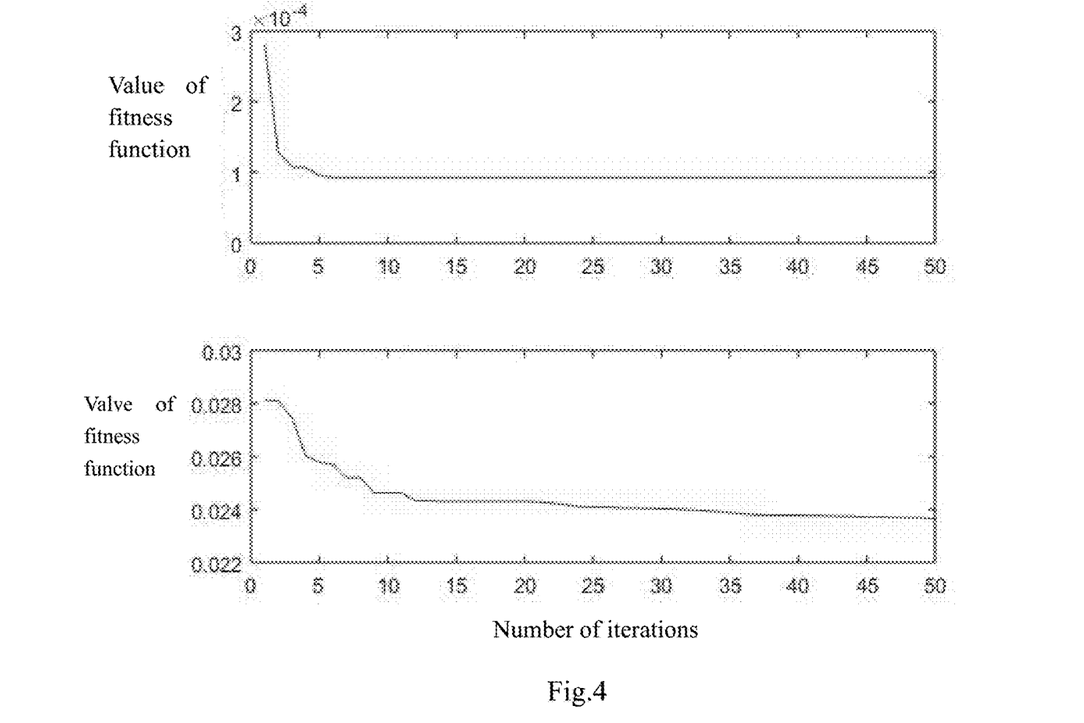
FIG. 4 is a curve graph showing a parameter optimization process of a particle swarm algorithm, wherein the upper part is a diagram of the optimized result of the particle swarm algorithm predicting compressor physical speed, and the lower part is a diagram of the optimized result of the particle swarm algorithm predicting exhaust gas temperature.

The parameter optimization result of SAE is shown in FIG. 4. The local best solution at the number of iterations when the minimum value of the fitness function is reached is selected as the parameter result: setting the parameters to dim=46, α=0.7060 during compressor physical speed prediction; and setting the parameters to dim=20, α=1.7428 during exhaust gas temperature prediction.

Step 4: building an SAE-RF regression model, predicting the aero-engine test data, and evaluating the prediction effect.

Considering the large magnitude difference of the reconstructed aero-engine test data, conducting normalization processing by the maximum value method to increase the convergence rate and avoid reduction in the prediction accuracy caused by the magnitude difference. Normalizing the features of the test data after sparse representation into the interval [1,2] according to the following formula:

$$x_k = \frac{x_k - x_{min}}{x_{max} - x_{min}} + 1$$

Among 100 groups of test data provided by a domestic research institute and used in the present invention, taking 90 groups as training data and the remaining 10 groups as predicted data to respectively complete prediction tasks for compressor physical speed and exhaust gas temperature in the transition state acceleration process key parameters, calculating the relative error distribution and mean square error of 10 groups of test data, and evaluating the prediction effect of the model.

Figure 5:
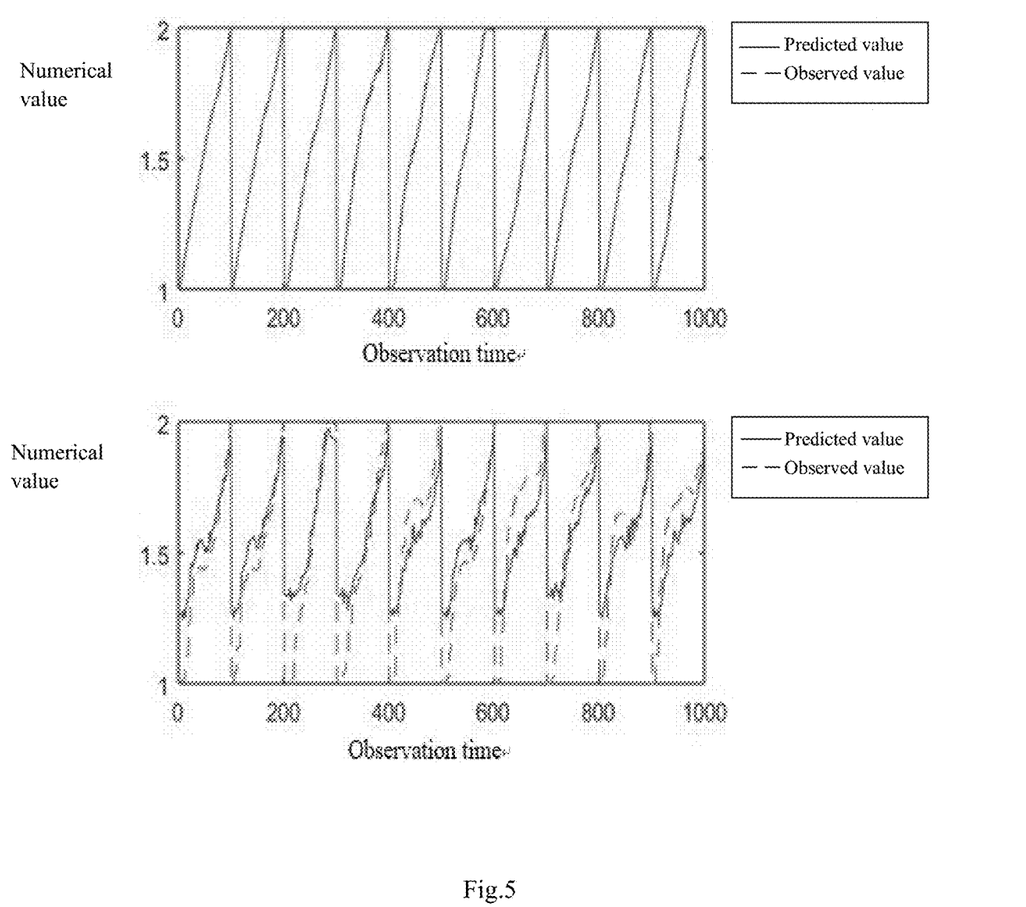
FIG. 5 shows predicted curves and observed curves of 10 groups of samples, wherein the upper part is a diagram of predicted results of compressor physical speed, and the lower part is a diagram of predicted results of exhaust gas temperature.
Figure 6:
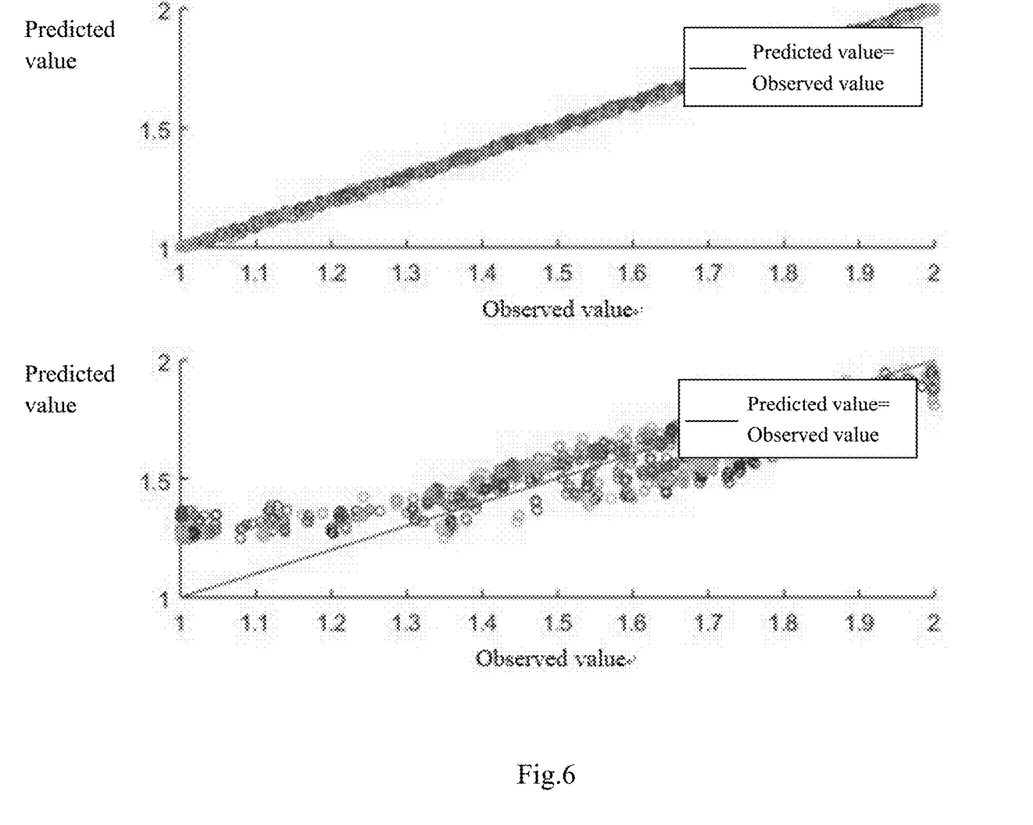
FIG. 6 is a schematic diagram of degree of deviation of predicted values from observed values of 10 groups of samples, wherein the upper part is a schematic diagram of degree of deviation of predicted values of compressor physical speed, and the lower part is a schematic diagram of degree of deviation of predicted values of exhaust gas temperature.
Figure 7:
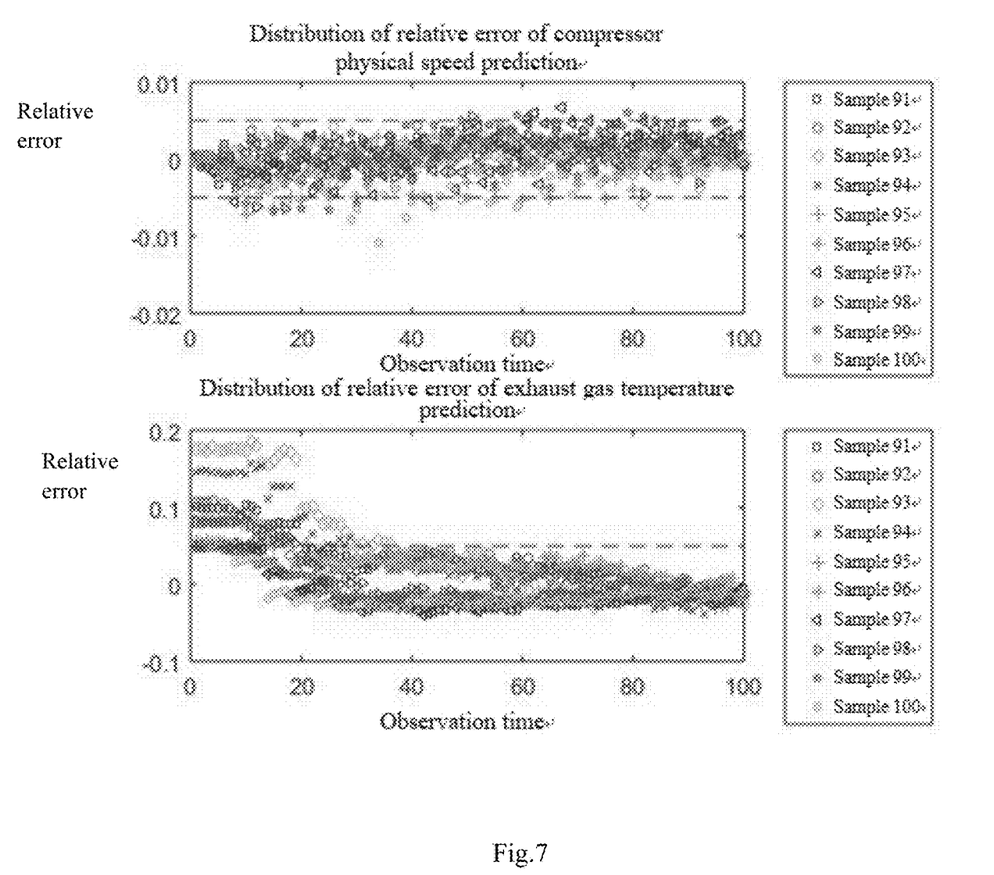
FIG. 7 is a distribution diagram of relative errors of 10 groups of samples, wherein the upper part is a distribution diagram of relative errors of compressor physical speed prediction, and the lower part is a distribution diagram of relative errors of exhaust gas temperature prediction.
Figure 8:
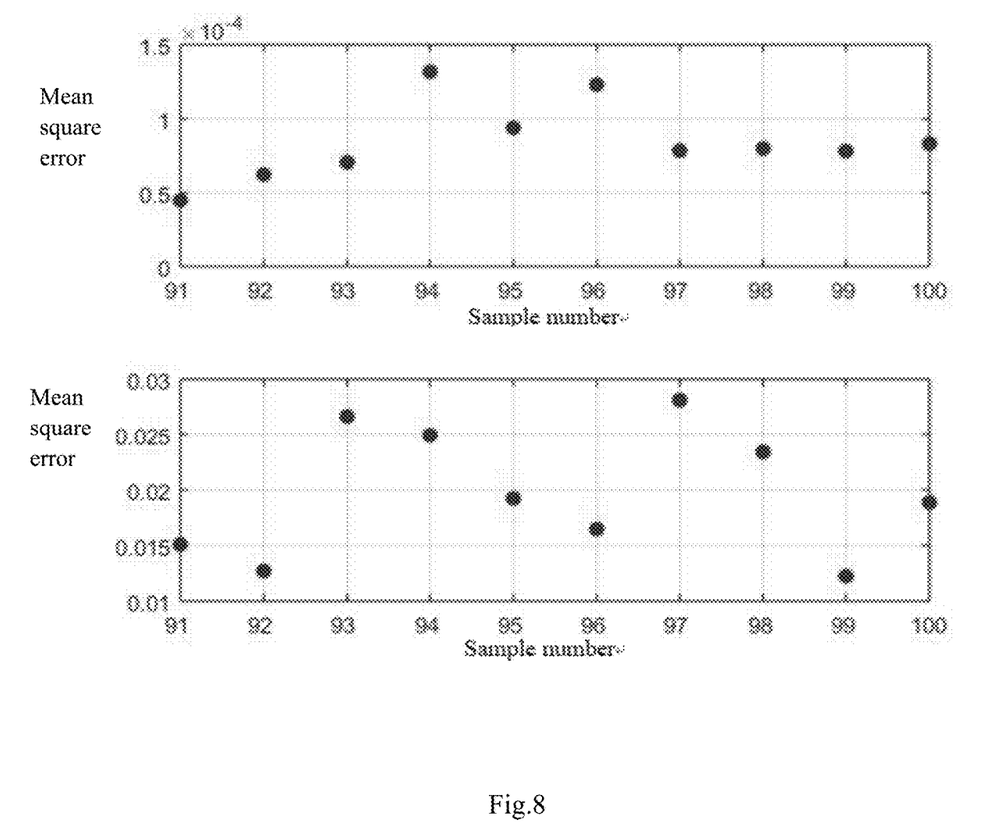
FIG. 8 is a distribution diagram of mean square errors of predicted sequence and observed sequence of 10 groups of samples, wherein the upper part is a diagram of mean square errors of compressor physical speed prediction, and the lower part is a diagram of mean square errors of exhaust gas temperature prediction.

As shown in FIG. 5 and FIG. 6, curves of the predicted values of the model and the observed values of the test of compressor physical speed nearly coincide, and the predicted values have almost no deviation from the observed values; and for the curves of the predicted values of the model and the observed values of the test of exhaust gas temperature, the effect is slightly poorer than the prediction effect of the compressor physical speed, and the predicted values have a large degree of deviation from the observed values at the start of the sample test. The reason is that the measurable test data features are closely related to the compressor physical speed, but the thermal part of the aero-engine gas path has complex structure, the thermodynamic relationship is difficult to describe, and the operating conditions of the sensor are harsh. FIG. 7 shows the distribution of relative errors at each observation time point of 10 groups of predicted samples. As shown in FIG. 8, even if the prediction effect of exhaust gas temperature is slightly poorer than that of compressor physical speed, the mean square errors of the 10 groups of predicted data samples can be completely controlled below the requirement of aero-engine key performance parameter prediction software.

TABLE 1

Mean Square Errors of Predicted Samples

| Sample number | Mean square error of compressor physical speed | Mean square error of exhaust gas temperature |
|---|---|---|
| 91 | $4.4756 \times 10^{-5}$ | $1.5095 \times 10^{-2}$ |
| 92 | $6.2384 \times 10^{-5}$ | $1.2713 \times 10^{-2}$ |
| 93 | $7.0633 \times 10^{-5}$ | $2.6651 \times 10^{-2}$ |
| 94 | $1.3170 \times 10^{-4}$ | $2.4940 \times 10^{-2}$ |
| 95 | $9.3826 \times 10^{-5}$ | $1.9236 \times 10^{-2}$ |
| 96 | $1.2296 \times 10^{-4}$ | $1.6477 \times 10^{-2}$ |
| 97 | $7.8499 \times 10^{-5}$ | $2.8127 \times 10^{-2}$ |
| 98 | $7.9962 \times 10^{-5}$ | $2.3424 \times 10^{-2}$ |
| 99 | $7.8157 \times 10^{-5}$ | $1.2246 \times 10^{-2}$ |
| 100 | $8.3156 \times 10^{-5}$ | $1.8875 \times 10^{-2}$ |

In conclusion, after the sparse auto-encoder based on the particle swarm algorithm optimization conducting dimension reconstruction on the aero-engine transition state acceleration process test data, the accuracy of predicting the key parameters such as compressor physical speed and exhaust gas temperature by the Random Forest regression algorithm can reach the desired effect. Therefore the present invention can be used in the fields of state prediction and fault diagnosis of an aero-engine.

The invention claimed is:

1. A method for prediction of key performance parameters of an aero-engine transition state acceleration process based on space reconstruction, comprising the following steps:

step 1: preprocessing aero-engine test data (1) aero-engine transition state acceleration process test data comprises 10 kinds of parameters: compressor inlet relative speed $PNNC2_g$, engine inlet temperature $T_2$, engine inlet pressure $P_2$, compressor outlet total pressure $P_3$, fuel flow WFB, fan physical speed $N_f$, compressor physical speed $N_c$, exhaust gas temperature $T_5$, simulated altitude H and simulated Mach Ma, which are taken as one sample;

(2) data storage and reading: the aero-engine transition state acceleration process test data comprises data collected at multiple aero-engine commissioning process sites; combining the data collected at multiple aero-engine commissioning process sites for the aero-engine acceleration process and storing the collected data uniformly, then establishing an aero-engine performance parameter test database;

(3) linear resampling: analyzing aero-engine transition state acceleration process test data; sampling different time intervals, a linear resampling method is adopted to resample the aero-engine transition state acceleration process test data to make sampling frequencies of signal identical;

(4) data screening and cleaning: conducting visualization processing on the linearly resampled aero-engine transition state acceleration process test data, and conducting cleaning on acceleration curves which obviously do not meet objective conditions;

step 2: conducting Random Forest regression model parameters selection the Random Forest regression model has two key parameters: ntree which is the number of Regression Trees in the Random Forest regression model; and mtry which is the feature number of Regression Trees in the Random Forest regression model, includes the number of branches of each Regression Tree; two-dimensional grid search is selected for ergodic calculation of the parameters ntree and mtry, and Mean Square Error (MSE) is selected for a fitness function; and an optimization range of the two-dimensional grid search is determined by the following principles:

(1) the optimization range of ntree is determined by the out-of-bag (OOB) error rate, wherein the out-of-bag error rate is an error rate caused by the Forest regression model of data which is not selected as training sample for a single Decision Tree at a time; variation curves of OOB calculated for compressor physical speed $N_c$ and engine exhaust gas temperature EGT as predicted test data feature parameters as well as the parameter ntree are obtained; and therefore the optimization range of ntree is determined to be 50~500;

(2) the optimization range of mtry is determined to be from the natural number 1 to the total feature number of the test data;

the Random Forest regression model parameters selection is finally determined to be ntree=300 and mtry=D/3 by the grid optimization algorithm, wherein D is the number of input variables of the Random Forest regression model;

step 3: establishing a training database by using a sparse auto-encoder after determining the parameters of the Random Forest regression model, determining related parameters of Sparse Auto-Encoder (SAE) by using an Sparse Auto-Encoder Random Forest (SAE-RF) hybrid model; establishing an input vector of the SAE-RF hybrid model by using SAE with the structure of 10-dim-10; and optimizing the parameters of SAE by a dispersed-continuous hybrid particle swarm algorithm, wherein parameters of SAE comprise learning rate a and reconstructed dimension dim;

using the particle swarm algorithm for optimization as follows: in two-dimensional parameter searching space, there is a population $X=(X_1, X_2, \ldots, X_n)$ composed of n parameter combinations, wherein the position of the $k^{th}$ parameter combination in the parameter searching space is expressed as a two-dimensional vector $X_k=(x_{k1},x_{k2})$; assuming the $k^{th}$ parameter combination has the velocity $V_k=(V_{k1},V_{k2})^T$ in the parameter searching space, the local best parameter thereof is $P_k=(P_{k1},P_{k2})^T$, and the global best parameter of the parameter combination is $P_g=(P_{g1},P_{g2})^T$; and in each iteration, the iterative formulas of the velocity and the position of the parameter combination are expressed as:

$$V_k^{t+1} = wV_k^t + c_1 r_1 (P_k^t - X_k^t) + c_2 r_2 (P_g^t - X_k^t)$$

$$X_k^{t+1} = X_k^t + V_k^{t+1}$$

where, w is inertia weight, t is the current number of iterations, $r_1, r_2$ are random numbers with uniform distribution in [0,1], and $c_1, c_2$ are learning factor constants;

a K-fold cross-validation method is used for the estimation of generalization ability in parameters selection, and the specific steps of optimizing the SAE-RF hybrid model parameters based on the dispersed-continuous hybrid particle swarm algorithm are as follows:

(1) randomly producing a group of {α, dim} as the initial position of particles, and determining inertia weight and learning factor;

(2) evenly splitting a training sample into k mutually exclusive subsets $S_1, S_2, \ldots, S_k$;

(3) taking the value of the initial position of the population as a parameter to train the SAE-RF hybrid model, and calculating the average value of k accuracies, which is the accuracy of the K-fold cross-validation;

(4) taking the accuracy of the K-fold cross-validation as the fitness of the particle swarm algorithm, calculating the local best position and the global best position of the population, and iterating and updating the position and velocity;

(5) repeating the step (2) until the fitness requirements are met or the maximum number of iterations is reached;

(6) completing the parameter optimization, and taking the result as the parameter of the final SAE-RF hybrid model;

step 4: building an SAE-RF regression model, predicting the aero-engine test data, and evaluating the prediction effect normalizing the data sample by a maximum value method to avoid the SAE-RF model error caused by magnitude difference; and normalizing the features of the aero-engine transition state acceleration process test data after sparse representation into the interval [1,2] according to the following formula:

$$x_k = \frac{x_k - x_{min}}{x_{max} - x_{min}} + 1$$

conducting regression prediction on the compressor physical speed $N_c$ and engine exhaust gas temperature EGT by using the aero-engine transition state acceleration process test data after dimension reconstruction, and calculating the response evaluating indicators;

evaluating indicators comprise:

(1) relative error RE formula of the relative error is:

$$RE = \frac{|\hat{y}_i - y_i|}{y_i}, i = 1, 2 \ldots N$$

where, $\hat{y}_i$ is the predicted value of the sample at the $i^{th}$ moment, $y_i$ is the observed value of the sample at the $i^{th}$ moment, and N is the length of the sample;

(2) Mean Square Error MSE mean square error is a measure reflecting the difference between the predicted sequence and the observed sequence, and is calculated according to the following formula:

$$MSE = \frac{1}{N} \sum_{i=1}^{N} (y_i - \hat{y}_i)^2$$

where, $\hat{y}_i$ is the predicted value of the sample at the $i^{th}$ moment, $y_i$ is the observed value of the sample at the $i^{th}$ moment, and N is the length of the sample.

* * * * *